US008676399B2

(12) United States Patent
Nutaro et al.

(10) Patent No.: US 8,676,399 B2
(45) Date of Patent: Mar. 18, 2014

(54) SYSTEM AND METHOD FOR GENERATING AND DISPLAYING AN ELECTRIC TAXI INDEX

(75) Inventors: Joseph Nutaro, Phoenix, AZ (US); Keith Hughes, Peoria, AZ (US); David Pepitone, Sun City West, AZ (US)

(73) Assignee: Honeywell International Inc., Morristown, NJ (US)

( * ) Notice: Subject to any disclaimer, the term of this patent is extended or adjusted under 35 U.S.C. 154(b) by 217 days.

(21) Appl. No.: 13/301,463

(22) Filed: Nov. 21, 2011

(65) Prior Publication Data

US 2013/0131888 A1 May 23, 2013

(51) Int. Cl.
*G05D 1/00* (2006.01)

(52) U.S. Cl.
USPC .................... 701/1; 701/14; 701/15; 701/16

(58) Field of Classification Search
USPC .................... 701/3, 7, 13–16, 22; 244/158.1; 180/65.21, 65.28, 65.31
See application file for complete search history.

(56) References Cited

U.S. PATENT DOCUMENTS 5,924,653 A 7/1999 Pedersen et al.
6,278,965 B1 8/2001 Glass et al.
6,920,390 B2 7/2005 Mallet et al.
7,333,887 B2 2/2008 Baida et al.
7,445,178 B2 * 11/2008 McCoskey et al. ............ 244/50
7,802,757 B2 * 9/2010 Dooley et al. .................. 244/60
2008/0058998 A1 3/2008 Breit
2008/0147252 A1 6/2008 Bayor
2010/0114922 A1 5/2010 Gayraud et al.
2010/0204909 A1 8/2010 Gayraud et al.

OTHER PUBLICATIONS

Atkin, et al.; A Statistical Approach for Taxi Time Estimation At London Heathrow Airport; School of Computer Science, University of Nottingham, Jubilee Campus, Nottingham, NG81BB, UK; pp. 61-63.
Hakkeling-Mesland, et al.; Evaluation of an Autonomous Taxi Solution for Airport Operations During Low Visibility Conditions; Ninth USA/Europe Air Traffic Management Research and Development Seminar (ATM 2011) pp. 1-10.

* cited by examiner

*Primary Examiner* — Gertrude Arthur Jeanglaude
(74) *Attorney, Agent, or Firm* — Ingrassia Fisher & Lorenz, P.C.

(57) ABSTRACT

A taxi method for an aircraft having a primary thrust engine taxi system and an electric taxi system is provided. The method involves obtaining aircraft and airport status data and generating therefrom taxi drive information indicative of the relative cost of taxiing the aircraft along a predetermined route using the electric taxi system versus the aircraft engine taxi system. The taxi drive index information is presented to a user.

20 Claims, 5 Drawing Sheets

SYSTEM AND METHOD FOR GENERATING AND DISPLAYING AN ELECTRIC TAXI INDEX

TECHNICAL FIELD

Embodiments of the subject matter described herein relate generally to avionics systems such as electric taxi systems. More particularly, embodiments of the subject matter relate to a system that generates displayable guidance information for an electric taxi system including the generation and display of an electric taxi index that assists a pilot in determining when to deploy electric taxi drive.

BACKGROUND

Modern flight deck displays for vehicles (such as aircraft or spacecraft) display a considerable amount of information, such as, vehicle position, speed, altitude, attitude, navigation, target, and terrain information. In the case of an aircraft, most modern displays additionally display a flight plan from different views, either a lateral view, a vertical view, or a perspective view, which can be displayed individually or simultaneously on the same display. Synthetic vision or simulated displays for aircraft applications are also being considered for certain scenarios, such as low visibility conditions. The primary perspective view used in synthetic vision systems emulates a forward-looking cockpit viewpoint. Such a view is intuitive and provides helpful visual information to the pilot and crew, especially during airport approaches and taxiing. In this regard, synthetic display systems for aircraft are beginning to employ realistic simulations of airports that include details such as runways, taxiways, buildings, etc. Moreover, many synthetic vision systems attempt to reproduce the real-world appearance of an airport field, including items such as light fixtures, taxiway signs, and runway signs. Flight deck display systems can be used to present taxi guidance information to the flight crew during taxi operations. For example, a synthetic flight deck display system can be used to show the desired taxi pathway to or from a terminal gate, along with a synthetic view of the airport.

Traditional aircraft taxi systems utilize the primary thrust engines (running at idle) and the braking system of the aircraft to regulate the speed of the aircraft during taxi. Such use of the primary thrust engines, however, is inefficient and wastes fuel. For this reason, electric taxi systems (i.e., traction drive systems that employ electric motors) have been developed for use with aircraft. Electric taxi systems can be more efficient than traditional engine-based taxi systems because they can be powered by an auxiliary power unit (APU) of the aircraft rather than the primary thrust engines. However, whether or not the use of electric drive to taxi is appropriate under a given set of conditions requires thought and judgment on the part of the pilot. Used inappropriately, electric taxi drive may be less effective and may even increase costs.

Accordingly, it is desirable to provide a system for use on an aircraft equipped with an electric drive taxi system that generates and displays an electric taxi index that assists a pilot in determining when to deploy electric taxi drive. Furthermore, other desirable features and characteristics will become apparent from the subsequent detailed description and the appended claims, taken in conjunction with the accompanying drawings and the foregoing technical field and background.

BRIEF SUMMARY

A taxi method for an aircraft having a primary thrust engine taxi system and an onboard electric taxi system is provided.

The method involves obtaining aircraft status data for the aircraft and airport status data associated with an airport from which the aircraft is departing or in which the aircraft is landing. The method continues by generating, in response to the aircraft status data and the airport status data, a taxi drive index indicative of the relative cost of taxiing the aircraft along a predetermined route using the electric taxi system versus the aircraft engine taxi system. The taxi drive index information is presented to a user.

Also provided is a method carried out by a cockpit display system including a cockpit monitor. The aircraft receives aircraft and airport status data relating to a host aircraft having a primary thrust engine taxi system and an electric drive taxi system. The cost of utilizing an electric drive taxi system is compared to the cost of utilizing an aircraft engine taxi system when taxiing a predetermined route. A display is generated on the cockpit monitor including symbology indicative of which taxi system would be less costly to operate.

A display system for deployment onboard an aircraft is also provided and includes a data source that provides a display system with data indicative of the relative efficiency of using an electric drive taxi system and an aircraft engine taxi system to travel along a predetermined path. The display system comprises a monitor for receiving and displaying taxi data, and a processor operatively coupled to the monitor and configured to generate a display on the monitor including symbology indicative whether it would be more cost effective to utilize the electric drive taxi system or the aircraft engine taxi system for a given taxi route.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The system and methods described herein can be deployed with any vehicle that may be subjected to taxi operations, such as aircraft. The exemplary embodiment described herein assumes that the aircraft includes an electric taxi system that utilizes one or more electric motors as a traction system to drive the wheels of the aircraft during taxi operations or is moved in some other manner such as attachment to other equipment. The system and methods presented here provide guidance information to the flight crew for purposes of optimizing or otherwise enhancing the operation of the electric taxi system. Such optimization may be based on one or more factors such as, without limitation: fuel conservation; prolonging the useful life of the brake system; and reducing taxi time. In certain embodiments, the taxi guidance information is rendered with a dynamic synthetic display of the airport field to provide visual guidance to the flight crew. The taxi guidance information may include a graphical indicator or message that represents, for taxi operations, the relative merit of using electric taxi or using the primary thrust engines.

Figure 1:
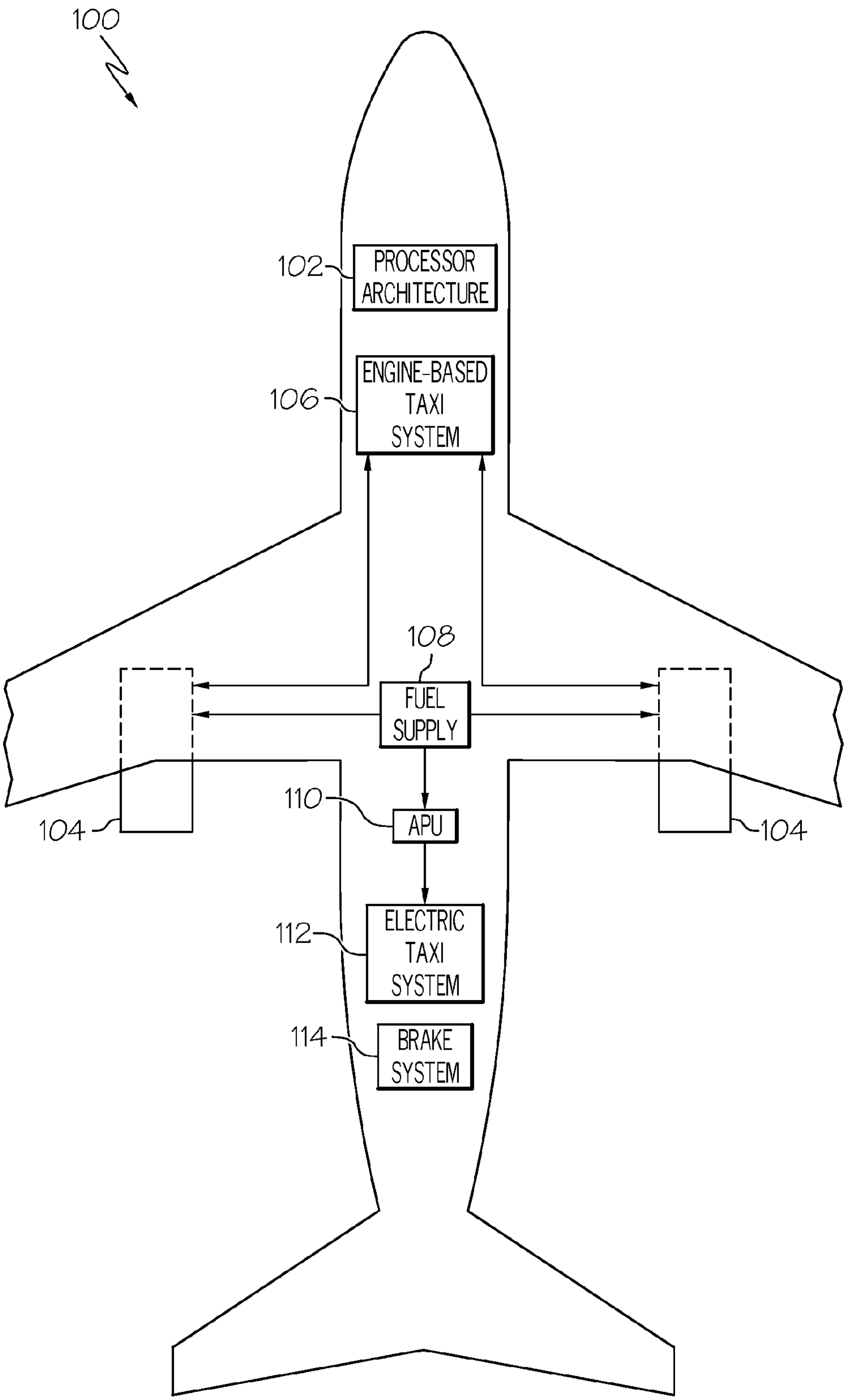
FIG. 1 is a simplified schematic representation of an aircraft having an electric taxi system.

FIG. 1 is a simplified schematic representation of an aircraft 100. For the sake of clarity and brevity, FIG. 1 does not depict the vast number of systems and subsystems that would appear onboard a practical implementation of the aircraft 100. Instead, FIG. 1 merely depicts some of the notable functional elements and components of the aircraft 100 that support the various features, functions, and operations described in more detail below. In this regard, the aircraft 100 may include, without limitation: a processor architecture 102; one or more primary thrust engines 104; an engine-based taxi system 106; a fuel supply 108; an auxiliary power unit (APU) 110; an electric taxi system 112; and a brake system 114. These elements, components, and systems may be coupled together as needed to support their cooperative functionality.

The processor architecture 102 may be implemented or realized with at least one general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. As described in more detail below, the processor architecture 102 is configured to support various electric taxi guidance processes, operations, and display functions.

In practice, the processor architecture 102 may be realized as an onboard component of the aircraft 100 (e.g., a flight deck control system, a flight management system, or the like), or it may be realized in a portable computing device that is carried onboard the aircraft 100. For example, the processor architecture 102 could be realized as the central processing unit (CPU) of a laptop computer, a tablet computer, or a handheld device. As another example, the processor architecture 102 could be implemented as the CPU of an electronic flight bag carried by a member of the flight crew or mounted permanently in the aircraft. Electronic flight bags and their operation are explained in documentation available from the United States Federal Aviation Administration (FAA), such as FAA document AC 120-76A.

The processor architecture 102 may include or cooperate with an appropriate amount of memory (not shown), which can be realized as RAM memory, flash memory, EPROM memory, EEPROM memory, registers, a hard disk, a removable disk, a CD-ROM, or any other form of storage medium known in the art. In this regard, the memory can be coupled to the processor architecture 102 such that the processor architecture 102 can read information from, and write information to, the memory. In the alternative, the memory may be integral to the processor architecture 102. In practice, a functional or logical module/component of the system described here might be realized using program code that is maintained in the memory. Moreover, the memory can be used to store data utilized to support the operation of the system, as will become apparent from the following description.

The illustrated embodiment of the aircraft includes at least two primary thrust engines 104, which may be fed by the fuel supply 108. The engines 104 serve as the primary sources of thrust during flight. The engines 104 may also function to provide a relatively low amount of thrust (e.g., at idle) to support a conventional engine-based taxi system 106. When running, the engines 104 typically provide a fixed amount of thrust to propel the aircraft 100 for taxi maneuvers. When the engines 104 are utilized for taxi operations, the speed of the aircraft is regulated by engine thrust and brake application, resulting in brake wear and tear.

Exemplary embodiments of the aircraft 100 also include the electric taxi system 112 (which may be in addition to or in lieu of the engine-based taxi system 106). In certain implementations, the electric taxi system 112 includes at least one electric motor (not shown in FIG. 1) that serves as the traction system for the drive wheels of the aircraft 100. The electric motor may be powered by the APU 110 onboard the aircraft 100, which in turn is fed by the fuel supply 108. As described in more detail below, the electric taxi system 112 can be controlled by a member of the flight crew to achieve a desired taxi speed. Unlike the traditional engine-based taxi system 106, in some cases, the electric taxi system 112 may be controlled to regulate the speed of the drive wheels without requiring constant or frequent actuation of the brake system 114. The aircraft 100 may employ any suitably configured electric taxi system 112, which employs electric motors to power the wheels of the aircraft during taxi operations.

The electric taxi system has controls on the flight deck that the pilot may use to guide the aircraft. However, in some electric taxi systems, enhancements are provided to make the task easier. The electric taxi index described herein is applicable in both cases. The following is a description of such an enhancement.

Figure 2:
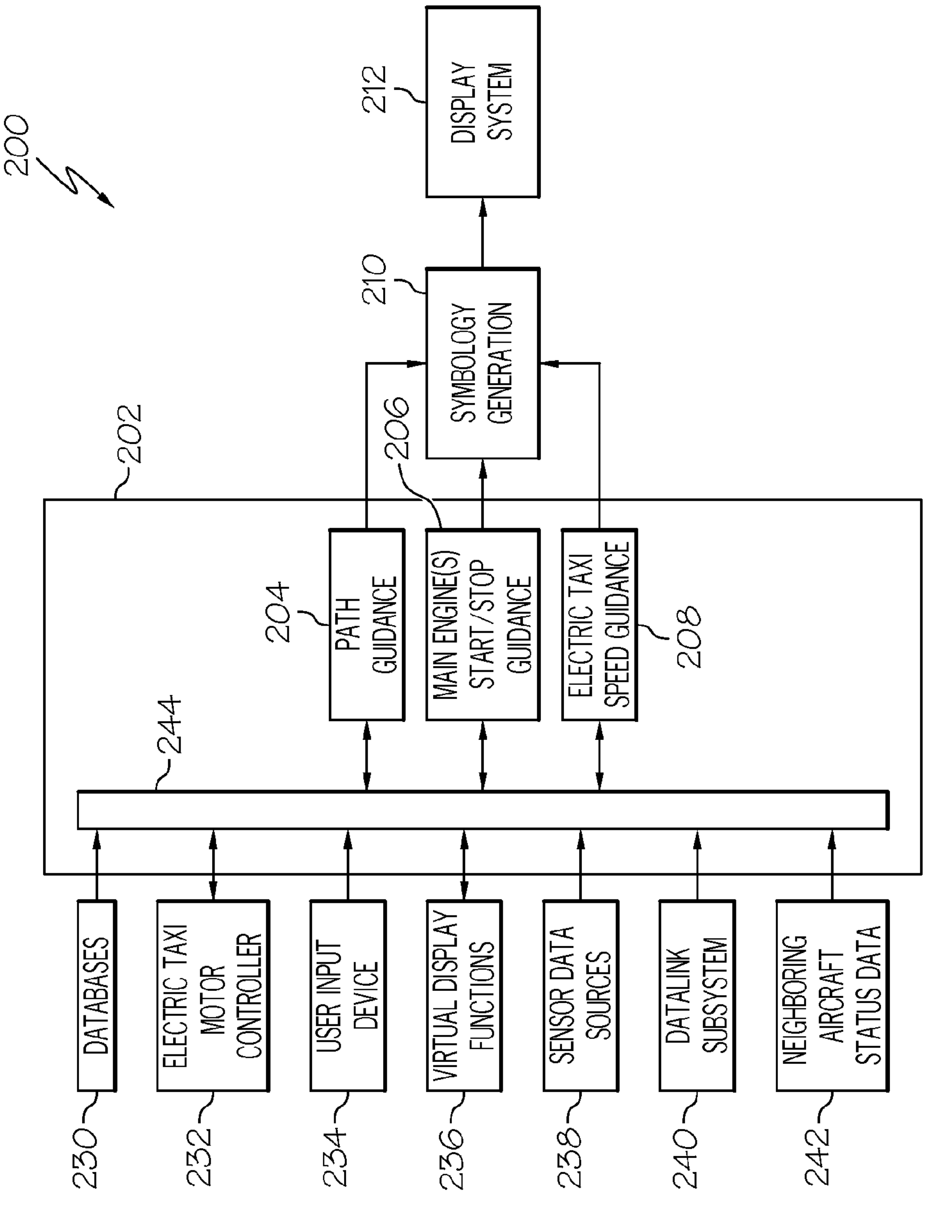
FIG. 2 is a schematic representation of a taxi guidance system suitable for use with an aircraft.

FIG. 2 is a schematic representation of an exemplary embodiment of a taxi guidance system 200 suitable for use with the aircraft 100 although a guidance system is not a required for use of the electric taxi index system described herein. Depending upon the particular embodiment, the taxi guidance system 200 may be realized in conjunction with a ground management system 202, which in turn may be implemented in a line replaceable unit (LRU) for the aircraft 100, in an onboard subsystem such as the flight deck display system, in an electronic flight bag, in an integrated modular avionics (IMA) system, or the like. The illustrated embodiment of the taxi guidance system 200 generally includes, without limitation: a path guidance module 204; an engine start/stop guidance module 206; an electric taxi speed guidance module 208; a symbology generation module 210; and a display system 212. The taxi guidance system 200 may also include or cooperate with one or more of the following elements, systems, components, or modules: databases 230; a controller 232 for the electric taxi system motor; at least one user input device 234; a virtual (synthetic) display module 236; sensor data sources 238; a datalink subsystem 240; and a source of neighboring aircraft status data 242. In practice, various functional or logical modules of the taxi guidance system 200 may be implemented with the processor architecture 102 (and associated memory) described above with reference to FIG. 1. The taxi guidance system 200 may employ any appropriate communication architecture 244 or arrangement that facilitates inter-function data communication, transmission of control and command signals, provision of operating power, transmission of sensor signals, etc.

The taxi guidance system 200 is suitably configured such that the path guidance module 204, the engine start/stop guidance module 206, and/or the electric taxi speed guidance module 208 are responsive to or are otherwise influenced by a variety of inputs. For this particular embodiment, the influencing inputs are obtained from one or more of the sources and components listed above (i.e., the items depicted at the left side of FIG. 2). The outputs of the path guidance module 204, the engine start/stop guidance module 206, and/or the electric taxi speed guidance module 208 are provided to the symbology generation module 210, which generates corresponding graphical representations suitable for rendering with a synthetic display of an airport field. The symbology generation module 210 cooperates with the display system 212 to present taxi guidance information to the user.

The databases 230 represent sources of data and information that may be used to generate taxi guidance information. For example, the databases 230 may store any of the following, without limitation: airport location data; airport feature data, which may include layout data, coordinate data, data related to the location and orientation of gates, runways, taxiways, etc.; airport restriction or limitation data; aircraft configuration data; aircraft model information; engine cool down parameters, such as cool down time period; engine warm up parameters, such as warm up time period; electric taxi system specifications; and the like. In certain embodiments, the databases 230 store airport feature data that is associated with (or can be used to generate) synthetic graphical representations of a departure or destination airport field. The databases 230 may be updated as needed to reflect the specific aircraft, the current flight plan, the departing and destination airports, and the like.

The controller 232 represents the control logic and hardware for the electric taxi motor. In this regard, the controller 232 may include one or more user interface elements that enable the pilot to activate, deactivate, and regulate the operation of the electric taxi system as needed. The controller 232 may also be configured to provide information related to the status of the electric taxi system, such as operating condition, wheel speed, motor speed, and the like.

The user input device 234 may be realized as a user interface that receives input from a user (e.g., a pilot) and, in response to the user input, supplies appropriate command signals to the taxi guidance system 200. The user interface may be any one, or any combination, of various known user interface devices or technologies, including, but not limited to: a cursor control device such as a mouse, a trackball, or joystick; a keyboard; buttons; switches; or knobs. Moreover, the user interface may cooperate with the display system 212 to provide a touch screen interface. The user input device 234 may be utilized to acquire various user-selected or user-entered data, which in turn influences the electric taxi guidance information generated by the taxi guidance system 200. For example, the user input device 234 could obtain any of the following, without limitation: a selected gate or terminal at an airport; a selected runway; user-entered taxiway directions; user-entered airport traffic conditions; user-entered weather conditions; runway attributes; and user options or preferences.

The virtual display module 236 may include a software application and/or processing logic to generate dynamic synthetic displays of airport fields during taxi operations. The virtual display module 236 may also be configured to generate dynamic synthetic displays of a cockpit view during flight. In practice, the virtual display module 236 cooperates with the symbology generation module 210 and the display system 212 to render graphical indicia of electric taxi guidance information, as described in more detail below.

The sensor data sources 238 represents various sensor elements, detectors, diagnostic components, and their associated subsystems onboard the aircraft. In this regard, the sensor data sources 238 functions as sources of aircraft status data for the host aircraft. In practice, the taxi guidance system 200 could consider any type or amount of aircraft status data including, without limitation, data indicative of: tire pressure; nose wheel angle; brake temperature; brake system status; outside temperature; ground temperature; engine thrust status; primary engine on/off status; aircraft ground speed; geographic position of the aircraft; wheel speed; electric taxi motor speed; electric taxi motor on/off status; or the like.

The datalink subsystem 240 is utilized to provide air traffic control data to the host aircraft, preferably in compliance with known standards and specifications. Using the datalink subsystem 240, the taxi guidance system 200 can receive air traffic control data from ground based air traffic controller stations and equipment. In turn, the system 200 can utilize such air traffic control data as needed. For example, taxi maneuver clearance and other airport navigation instructions may be provided by an air traffic controller using the datalink subsystem 240.

In an exemplary embodiment, the host aircraft supports data communication with one or more remote systems. More specifically, the host aircraft receives status data for neighboring aircraft using, for example, an aircraft-to-aircraft data communication module (i.e., the source of neighboring aircraft status data 242). For example, the source of neighboring aircraft status data 242 may be configured for compatibility with Automatic Dependent Surveillance-Broadcast (ADS-B) technology, with Traffic and Collision Avoidance System (TCAS) technology, and/or with similar technologies.

The path guidance module 204, the engine start/stop guidance module 206, and the electric taxi speed guidance module 208 are suitably configured to respond in a dynamic manner to provide real-time guidance for optimized operation of the electric taxi system. In practice, the taxi guidance information (e.g., taxi path guidance information, start/stop guidance information for the engines, and speed guidance information for the electric taxi system) might be generated in accordance with a fuel conservation specification or guideline for the aircraft, in accordance with an operating life longevity specification or guideline for the brake system 114 (see FIG. 1), and/or in accordance with other optimization factors or parameters. To this end, the path guidance module 204 processes relevant input data and, in response thereto, generates taxi path guidance information related to a desired taxi route to follow. The desired taxi route can then be presented to the flight crew in an appropriate manner. The engine start/stop guidance module 206 processes relevant input data and, in response thereto, generates start/stop guidance information that is associated with operation of the primary thrust engine(s) and/or is associated with operation of the electric taxi system. As explained in more detail below, the start/stop guidance information may be presented to the user in the form of displayed markers or indicators in a synthetic graphical representation of the airport field. The electric taxi speed guidance module 208 processes relevant input data and, in response thereto, generates speed guidance information for the onboard electric taxi system. The speed guidance information may be presented to the user as a dynamic alphanumeric field displayed in the synthetic representation of the airport field.

The symbology generation module 210 can be suitably configured to receive the output of the path guidance module 204, the engine start/stop guidance module 206, and the electric taxi speed guidance module 208, and process the received information in an appropriate manner for incorporation, blending, and integration with the dynamic synthetic representation of the airport field. Thus, the electric taxi guidance information can be merged into the synthetic display to provide enhanced situational awareness and taxi instructions to the pilot in real-time.

The exemplary embodiment described here relies on graphically displayed and rendered taxi guidance information. Accordingly, the display system 212 includes at least one display element. In an exemplary embodiment, the display element cooperates with a suitably configured graphics system (not shown), which may include the symbology generation module 210 as a component thereof. This allows the display system 212 to display, render, or otherwise convey one or more graphical representations, synthetic displays, graphical icons, visual symbology, or images associated with operation of the host aircraft on the display element, as described in greater detail below. In practice, the display element receives image rendering display commands from the display system 212 and, in response to those commands, renders a dynamic synthetic representation of the airport field during taxi operations.

In an exemplary embodiment, the display element is realized as an electronic display configured to graphically display flight information or other data associated with operation of the host aircraft under control of the display system 212. The display system 212 is usually located within a cockpit of the host aircraft. Alternatively (or additionally), the display system 212 could be realized in a portable computer, and electronic flight bag, or the like.

Although the exemplary embodiment described here presents the guidance information in a graphical (displayed) manner, the guidance information could alternatively or additionally be annunciated in an audible manner. For example, in lieu of graphics, the system could provide audible instructions or warnings about when to shut the main engines down, when to turn the main engines one. As another example, the system may utilize indicator lights or other types of feedback instead of a synthetic display of the airport field.

Figure 3:
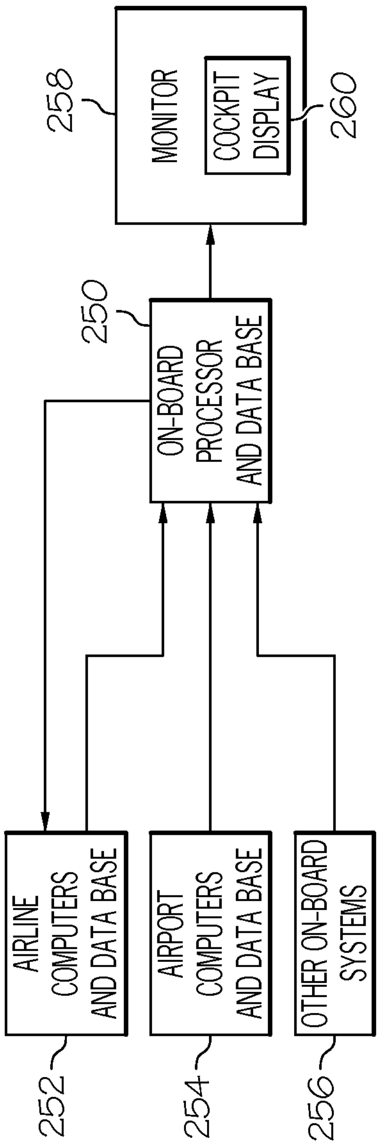
FIG. 3 is a simplified block diagram of a generalized avionics display system in accordance with an exemplary embodiment.

FIG. 3 is a simplified block diagram of a system for use on an aircraft equipped with an electric drive taxi system that aids a pilot when determines whether to use the primary thrust engines for taxi or to deploy the electric drive taxi system. Referring to FIG. 3, an onboard processor 250 (processor 102 in FIG. 1 or an additional onboard processor) receives data from an operator's ground computers and data bases 252 and from the airport operator's ground computers and data bases 254 at which the aircraft is landing or is preparing to depart from. For example, airline computers 252 may provide data to processor 250 relating to aircraft type, brake and taxi operational costs, costs of fuel and the equivalent cost associated with the local carbon footprint, and the historical success of using electric drive for a similar aircraft under similar conditions, as will be more fully described below. The data may be transferred wirelessly as, for example, using ACARS (Aircraft Communications Addressing and Reporting Systems) or collected on the ground by connecting to a terminal at the gate. In addition, the airline's ground computers 252 receive data from the aircraft's on-board processor and data base 250.

The airport operator's computers 254 may provide data to processor 250 related to runway and taxiway conditions including distance to gate or takeoff point, congestion at the gate when landing, or the number of planes waiting to take off, and airport configuration and maps showing the number of turns, bends, permitted speeds, etc. Such information may be transmitted via datalink, ACARS, wireless vocal radio, etc.

In addition, data may be provided to processor 250 from other on-board systems 256 such air data systems, flight management systems, fault warning systems, auto-brake systems and a flight control computer, which may provide data such as current estimated gross weight of the aircraft, aircraft GPS position, aircraft position relative to airport surface, aircraft groundspeed, auto-brake setting, and environmental conditions such as outside air temperature, weather, RVR visibility, taxiway or runway surface conditions, wind speed and direction, and local or zulu time of day, etc. In addition, such data for on-ground conditions prior to landing may be provided by the airport operator and systems.

It should be clear that while much of the data discussed above may be automatically provided to the aircraft by any well-known data transfer means (datalink, ACARS, direct connection, etc.), much of this data (e.g., aircraft type and estimated weight, cost of fuel, equivalent cost of carbon footprint, etc.) may be provided by other on-board systems such as air data systems and flight management systems. In addition, some of this may be entered into a processor manually by a member of the crew as will be more fully described in connection with FIG. 4.

Processor 250 is operatively coupled to monitor 258 and generates a graphical display 260 that visually provides the pilot and crew with navigational information pertaining to the host aircraft as well as any neighboring aircrafts of interest. Display 260 may include visual representations of one or more flight characteristics pertaining to neighboring aircraft as is well known. Processor 250 may drive monitor 260 to produce symbology on display 260 in a two dimensional format (e.g., as a moving map display), in a three dimensional format (e.g., as a perspective display), or in a hybrid format (e.g., in a picture-in-picture or split screen format).

Processor 250 may comprise, or be associated with, any suitable number of additional conventional electronic components, including, but not limited to, various combinations of microprocessors, flight control computers, navigational equipment, memories, power supplies, storage devices, interface cards, and other standard components known in the art. Furthermore, processor 250 may include, or cooperate with, any number of software programs (e.g., avionics display programs) or instructions designed to carry out the methods, process tasks, calculations, and control/display functions described below.

Image-generating devices suitable for use as monitor 258 include various analog (e.g., cathode ray tube) and digital (e.g., liquid crystal, active matrix, plasma, etc.) display devices. In certain embodiments, monitor 258 may assume the form of a Head-Down Display (HDD) or a Head-Up Display (HUD) included within an aircraft's Electronic Flight Instrument System (EFIS). Monitor 258 may be disposed at various locations throughout the cockpit. For example, monitor 258 may comprise a primary flight display (PFD) and reside at a central location within the pilot's primary field-of-view. Alternately, monitor 258 may comprise a secondary flight deck display, such as an Engine Instrument and Crew Advisory System (EICAS) display, mounted at a location for convenient observation by the aircraft crew but that generally resides outside of the pilot's primary field-of-view. In still further embodiments, monitor 258 may be carried by one or more members of the flight crew (e.g., a laptop computer or electronic flight bag).

Data sources 252, 254, and 256 (FIG. 3), as well as data sources 230, 232, 234, 236, 238, 240, and 242 described in connection with FIG. 2 may, for example, provide static and/or real-time information to processor 250, which processor 250 may utilize to generate one or more displays on monitor 258, such as a navigational map display. The data sources may include a wide variety of informational systems, which may reside onboard the aircraft or at a remote location. By way of example, the data sources may include one or more of the following systems: a runaway awareness and advisory system, an instrument landing system, an airport data base, a flight director system, a weather data system, a terrain avoidance and warning system, a traffic and collision avoidance system, a terrain database, an initial reference system, and a navigational database. The data sources may also include mode, position, and/or detection elements (e.g., gyroscopes, global positioning systems, inertial reference systems, etc.) capable of determining the mode and/or position of the aircraft relative to one or more reference locations, points, planes, or navigation aids. Data may be retrieved from other sources or manually entered if no guidance system is available.

The data described above may be utilized by processor 250 to generate an electric drive index that provides an indicator to the pilot as to whether electric taxi drive of the aircraft's wheels should be selected instead of the aircraft's thrust engines and brakes as previously described. This is especially useful when the pilot is at an unfamiliar airport, or is operating under difficult or ambiguous runway conditions.

The electric drive index represents a comparison of the costs associated with a given taxi (either from gate to a takeoff point or from a landing point to gate) using (1) electric taxi drive, and (2) aircraft engines and brakes.

Equation (1) represents an example of how the cost ($C_{ed}$) of utilizing electric drive for a given departure taxi may be determined. Referring to Equation (1):

$$C_{ed}=CB_{apu}(T_{ed}+T_w)+CF_{apu}(T_{ed}+T_w)+C_{est}+C_{eb} \quad (1)$$

where $CB_{apu}$ is the local carbon footprint cost-per-second associated with the Auxiliary Power Unit, $T_{ed}$ is the time it takes to reach the takeoff point using electric drive, $T_w$ is the additional time consumed waiting for leading aircraft to take off (e.g. two minutes per aircraft), $CF_{apu}$ is the cost-per-second of fuel consumed by the APU, $C_{est}$ is the estimated cost of starting the aircraft's engines, and $C_{eb}$ is the estimated cost of backing up from the gate using electric drive and no tug. $T_w$ and $T_{ed}$ are estimated from calculations that include time to travel the airport using typical speeds and accelerations, starts and stops due to estimated congestion, and airport physical layout. Equation (2) represents a similar example of how the cost ($C_{ad}$) of utilizing aircraft engine drive for the same take-off taxi may be determined. Referring to Equation (2):

$$C_{ad}=CB_{eng}(T_{ad}+T_w)+CF_{eng}(T_{ad}+T_w)+C_{est}+C_{ab} \quad (2)$$

where $CB_{eng}$ is the carbon footprint cost-per-second associated with the aircraft engines, $T_{ad}$ is the time to reach the takeoff point using aircraft engines and brakes, $CF_{eng}$ is the cost-per-second of fuel consumed by the aircraft engines, $C_{ese}$ is the estimated cost of starting the aircraft engines, and $C_{ab}$ is the estimated cost of backing up from the gate using tug and/or aircraft engines.

Both $C_{ed}$ and $C_{ad}$ may be provided to monitor 258 by processor 250 and displayed on display 260. If it is determined that $C_{ed}$ is less than $C_{ad}$, then the pilot would likely initiate electric taxi drive. Of course, the result could be displayed or presented on display 260 in the form of a ratio $C_{ad}/C_{ed}$. Thus, should this ratio be greater than 1.00, a pilot may select electric drive absent other circumstances that would suggest the contrary. Alternatively, a message may be displayed on display 260 recommending that the pilot "USE ELECTRIC DRIVE". An audible instruction may be generated alternatively or additionally.

As further criteria in the process of determining when to select electric drive taxi, it may be desirable to select a threshold factor to accommodate variations in parameters such as aircraft location or turn-around time that is added to the cost of using electric drive ($C_{ed}$). Thus, electric taxi drive may be selected if $(C_{ed}+C_t)<C_{ad}$ where $C_t$ represents the threshold function. Alternatively, $C_t$ may represent a direct cost such as seat mile cost, crew cost, etc.

As was stated previously, on-board-processor 250 also provides data to the airline operator's computers for analysis in a timely manner in order to provide parameters such as an airport experience factor indicating the percentage of time that electric drive was selected using the above criteria and actually resulted in cost savings. If previous experience at the airport was highly successful under similar conditions, then the value of $C_t$ could be reduced. Also, the values of $C_{ed}$ and $C_{ad}$ can be averaged based on a number of historical calculations of (i.e. $C_{ed}$(AV)) and $C_{ad}$(AV). Then, electric taxi drive would be selected if $C_{ed}(AV)+C_t$ is less than $C_{ad}$(AV).

It is contemplated that the above-described process can be more detailed for greater accuracy. For example, by using the airport configuration and the relative distances therein, and aircraft weight, the process may include calculating the amount of APU fuel consumed to travel to the point of takeoff using the maximum allowable electric drive acceleration and airport speeds. This speed may be integrated taking into account the number of times the aircraft must brake at runway crossings and turns. Acceleration, speeds, and braking distances may be modified depending upon runway conditions and time of day, since acceleration and speeds are lower in bad weather and at night. In addition, the process can take into account other factors such as the estimated number of starts and stops for other aircraft. Additionally, the process may be varied by probabilistic variables, recalculated, and the results averaged. For example, the process may be performed taking into account two additional stops due to other aircraft or tower instructions, then four additional stops, etc. The number of additional stops can be a function of the specific airport, i.e. some airports are busier than others. A probabilistic value of confidence can be displayed along with the recommendation.

Figure 4:
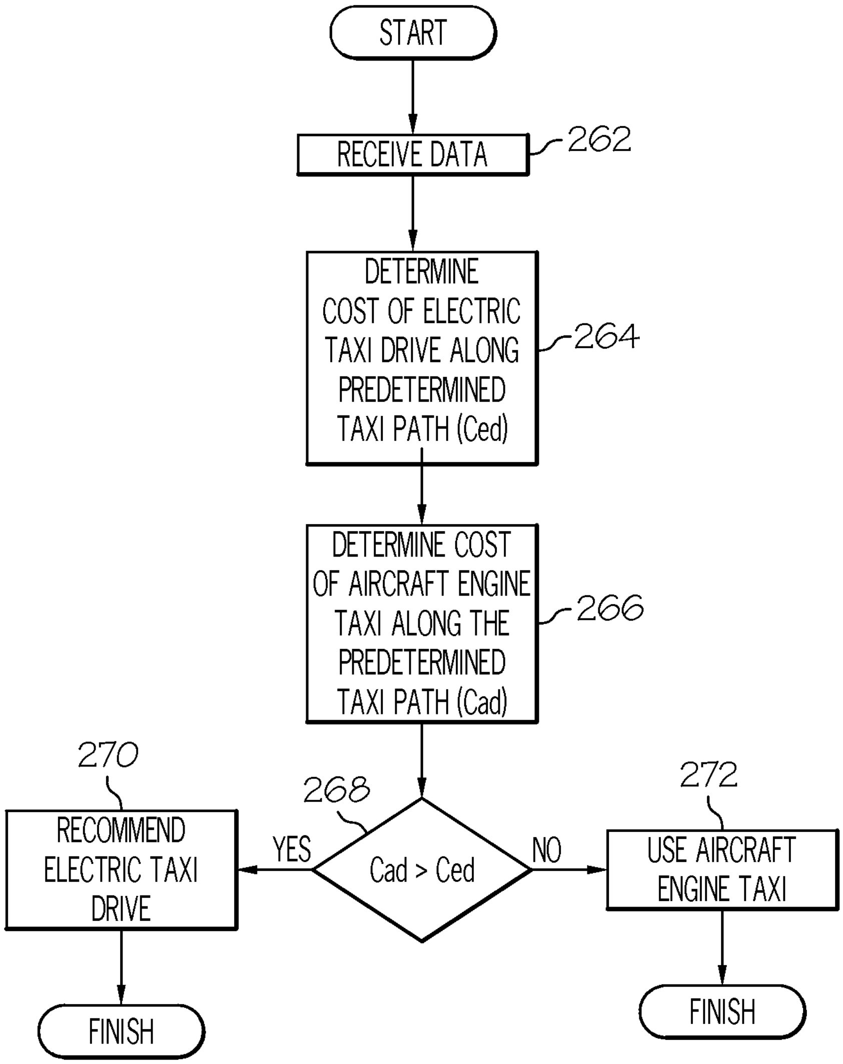
FIG. 4 is a flow chart illustrating an exemplary embodiment of a process for selecting a taxi drive system.

FIG. 4 is a flow chart illustrating an exemplary method that may be carried out by processor 250 (FIG. 3) to generate an electric drive index on monitor 258. To commence (STEP 262), processor 250 receives airline data, airport data and/or data from other onboard aircraft systems. Next, processor 250 estimates the cost associated with taxiing along a predetermined path using electric taxi drive (STEP 264) and aircraft engine taxi drive (STEP 266). If the estimated cost of aircraft engine taxi drive exceeds that of electric taxi drive (STEP 268), electric taxi drive is recommended (STEP 270). If the cost of aircraft engine taxi drive is less than or equal to that of electric taxi drive, aircraft engine taxi is selected.

Figure 5:
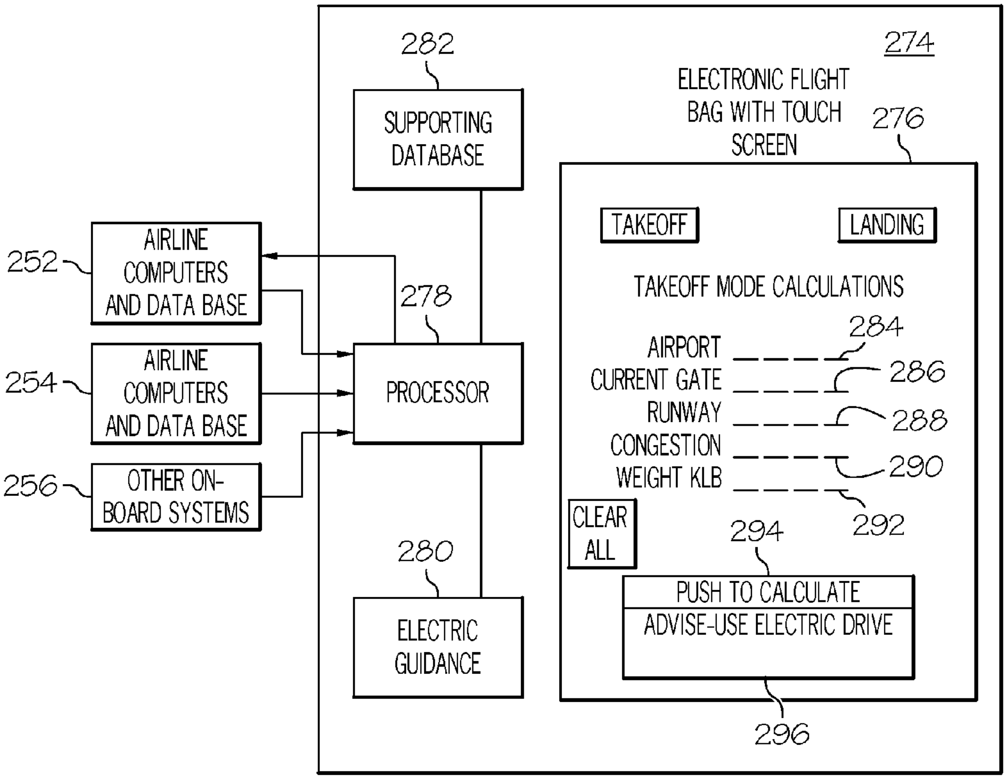
FIG. 5 is a simplified block diagram of a taxi drive display system in accordance with a further embodiment.

FIG. 5 is a block diagram of an embodiment utilizing a portable device such as an electronic flight bag (EFB) 274 a touchscreen 276 and a processor 278. In this case, when EFB 274 is deployed in an aircraft, processor 278 receives airline data (252), airport data (254), and data from other onboard systems (256) as was the case previously in connection with the system shown in FIG. 3. Processor 278 also receives data from electric guidance 280 (discussed in connection with FIG. 2) and from its own supporting database 282, which contains information relating to aircraft configuration airport maps, etc.

As can be seen, a pilot can clear previous data by pressing "CLEAR" and then select "TAKEOFF" or "LANDING", as the case may be. The pilot may then manually enter airport, runway, and gate information indicated at 284, 286, and 288. This may be accomplished using any suitable input device (not shown); e.g., keyboard, trackball, cursor, etc. The pilot may also enter a congestion factor at 290 indicating the extent to which aircraft are awaiting takeoff or landing as the case may be. This could take into account factors such as estimated time to the runway or gate, estimated time to departure or landing, etc. It is anticipated that these values will be available to meet the next generation air traffic control requirements.

Finally, the pilot may manually enter the current weight of the aircraft at 292. By pressing PUSH TO CALCULATE (294), processor 278 will perform the process described above to determine if the aircraft engine taxi drive or electric taxi drive should be advised at 296.

Thus, there has been a provided system for use in conjunction with an aircraft taxi system capable of displaying information that is intended to conserve fuel, extend the operating life of the aircraft brake system, and the like. The system is capable of generating and displaying an electric taxi index that assists a pilot in determining when to deploy electric taxi drive.

While at least one exemplary embodiment has been presented in the foregoing detailed description, it should be appreciated that a vast number of variations exist. For, example, the electric taxi index described herein may be employed with or without a guidance system. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A taxi method for an aircraft having a primary thrust engine taxi system and an electric taxi system, the method comprising:

obtaining aircraft status data for the aircraft;

obtaining airport status data associated with an airport;

generating, in response to the aircraft status data and the airport status data, taxi drive information indicative of the relative cost of taxiing the aircraft along a predetermined route using the electric taxi system and the aircraft engine taxi system; and presenting the taxi drive information to a user.

2. A method according to claim 1, further comprising presenting the aircraft status data and the airport status data to a processor onboard the aircraft.

3. A method according to claim 2, wherein the processor is an electronic flight bag.

4. A method according to claim 2, wherein the step of obtaining aircraft status data comprises obtaining information from an airline operator.

5. A method according to claim 3, wherein the step of obtaining aircraft status data comprises obtaining information from systems onboard the aircraft.

6. A method according to claim 4, wherein the step of obtaining airport status data comprises obtaining information from at least one of an airport operator and an airport service.

7. A method according to claim 1, wherein the step of generating comprises displaying recommending use of the electric drive taxi system if the cost of using the electric drive taxi system is less than the cost of using the engine taxi system.

8. A method according to claim 7, wherein the step of generating comprises displaying taxi drive information that recommends using the electric drive index if the cost of using the electric drive taxi system is less than the cost of using the engine taxi system by a predetermined threshold.

9. A method according to claim 8, wherein the predetermined threshold is related to a historical success rate of reducing cost when the electric drive system has been selected under similar conditions.

10. A method according to claim 1, wherein the aircraft status data comprises its weight, engine, and apu fuel burn characteristics.

11. A method according to claim 10, wherein the airport status data comprises at least one of airport identification, airport configuration, gate number, runway identification, taxi route clearance, and congestion data.

12. A method carried out by a cockpit display system including a cockpit monitor, the method comprising:

receiving aircraft and airport status data relating to a host aircraft having a primary thrust engine taxi system and an electric drive taxi system;

comparing the cost of utilizing an electric drive taxi system to the cost of utilizing an aircraft engine taxi system when taxiing a predetermined route; and generating a display on the cockpit monitor including symbology indicative of which taxi system would be less costly to operate.

13. A method according to claim 12, further comprising displaying the symbology on a touchscreen display.

14. A method according to claim 13, further comprising, entering aircraft and airport status data via the touchscreen display.

15. A method according to claim 14, further comprising selecting on the touchscreen display whether the predetermined route is prior to takeoff or prior to landing.

16. A method according to claim 15, further comprising entering information relating to aircraft data and aircraft data.

17. A display system for deployment onboard an aircraft including a data source that provides a display system with data indicative of the relative efficiency of using an electric drive taxi system and an aircraft engine taxi system to travel along a predetermined path, comprising:

a monitor for receiving and displaying taxi data; and a processor operatively coupled to the monitor and configured to generate a display including symbology indicative whether it would be more cost effective to utilize the electric drive taxi system or the aircraft engine taxi system for a given taxi route.

18. A display system according to claim 17, wherein the processor is configured to receive airport and airline status data relating to the aircraft.

19. A display system according to claim 18 wherein the processor is configured to generate a display on the monitor including symbology recommending use of the electric drive taxi system if the predicted cost of using the electric drive taxi system along a predetermined taxi route is less than that of using the aircraft engine taxi system.

20. A display system according to claim 19, wherein the processor is a portable processor.

* * * * *